United States Patent Office 3,486,073
Patented Dec. 23, 1969

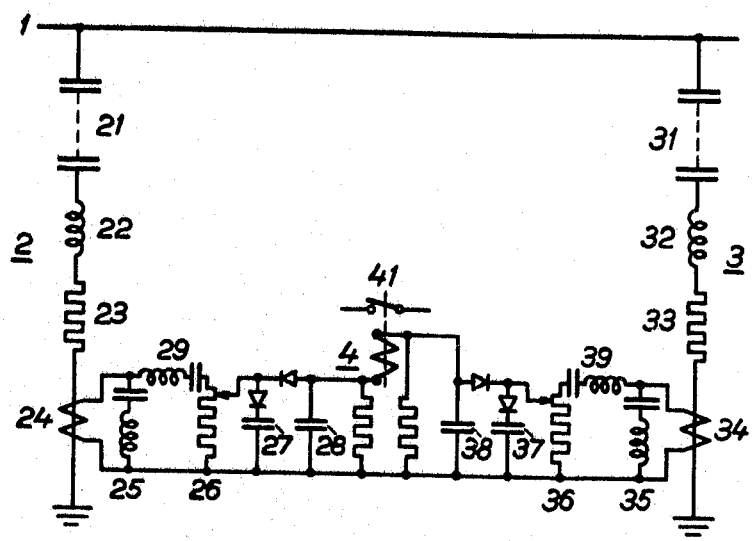

3,486,073
PROTECTION MEANS FOR SINGLE-PHASE CAPACITOR BANKS
Karl-Axel Eriksson, Duncan, British Columbia, Canada, and Martin Tveteras, Ludvika, Sweden, assignors to Allmanna Svenska Elektriska Aktiebolaget, Vasteras, Sweden, a corporation of Sweden
Filed Mar. 14, 1967, Ser. No. 623,124
Claims priority, application Sweden, Mar. 21, 1966, 3,690/66
Int. Cl. H02h 7/16
U.S. Cl. 317—12                                    2 Claims

ABSTRACT OF THE DISCLOSURE

A capacitor bank with two parallel branches has transformers with their primaries in the branches and their secondaries counter connected through adjusting means to a relay, the adjusting means being set so that in the absence of a fault the voltages fed to the relay are substantially equal.

Field of the invention

The present invention relates to a protection means for a single phase capacitor battery comprising at least two parallel branches.

The prior art

The present invention is a development of the invention described in U.S. patent application S.N. 364,957.

A protection means is described in said application for a single phase capacitor battery consisting of at least two parallel branches, which protection means, for each branch of the capacitor battery, includes a measuring transformer with adjustable secondary circuit and in which the various measuring transformers are counter-connected in pairs and connected to an indicating means. Such a protection means also includes a separate compensating means to compensate for the difference between the signals emitting from the two measuring transformers.

Summary of the invention

According to the present invention, it is proposed instead of said compensating means to insert adjustment means in the secondary circuits of the measuring transformers, which adjustment means are set so that the difference between the signals from two measuring transformers connected together is as little as possible in relation to the absolute value of the signals. It has been found that if the phase angle between the signals from two measuring transformers connected together is small, the difference between said signals, if the adjustment means is suitably set, is so little that it does not noticeably affect the selectivity and sensitivity of the protection means.

According to a further development of the present invention it is proposed for each measuring transformer to connect means for rectifying the output signal of the measuring transformer in question, whereby the indicating means will compare the numerical values of said signals, so that with the adjustment means it is also possible to make the two signals exactly equal.

The invention will be further described with reference to the accompanying drawings which shows a protection means according to the present invention.

The figure shows two parallel-connected capacitor batteries 21 and 31, each comprising a number of series connected capacitors, connected to an A.C. network 1. The capacitor batteries 21 and 31 form the capacitive parts of filter circuits 2 and 3 respectively, as used on the A.C. side of a static converter. Besides the capacitive parts 21 and 31, respectively, the filter circuits 2 and 3 include inductive parts 22 and 32, respectively and resistive parts 23 and 33, respectively. In each filter circuit a current transformer 24, 34, respectively has been inserted, the secondary side of which is connected to a band-pass filter 25, 29 and 35, 39, respectively. The circuits 25 and 35 are tuned for the harmonic frequency of the corresponding filter branch 2, 3, respectively, while the circuits 29 and 39 are tuned for the basic frequency of the alternating voltage in the network 1. In this way the characteristic harmonics for the filters 2 and 3 will be short-circuited by the filters 25 and 35, while possible further harmonics will be blocked by the filters 29 and 39, respectively. Said band-pass filters are connected to respective potentiometers 26 and 36. To the variable outputs of each of said potentiometers have been connected two parallel-connected capacitors 27, 28 and 37, 38, respectively and each capacitor has been connected in series with a diode. The diodes belonging to a filter circuit are reverse-parallel-connected. The voltages across the capacitors 28 and 38 are counter-connected to each other across an indicating device in the form of a relay 4 provided with a relay contact 41.

When an alternating voltage is connected to the network 1, each current transformer will deliver an output voltage. This output voltage passes the corresponding band-pass filters 25, 29 and 35, 39, respectively so that the potentiometers 26, 36 will receive an alternating voltage corresponding to the basic current in the filter circuit in question. The alternating voltage across each potentiometer is taken out from a variable output on the potentiometer and will thus charge the corresponding two capacitors with opposite polarity due to the diodes. Thus the capacitors 28 and 38 will be charged to a certain voltage and these voltages are counter-connected over the relay 4. The capacitors 28 and 38 are suitably parallel-connected each to its own high-ohmic discharge resistor.

By adjustment of the potentiometers 26 and 36 the voltages across the capacitors 28 and 38 can be made equal so that the voltage across the relay 4 will be zero and this relay is thus in off-position as long as the capacitor groups 21 and 31 are faultless. If a fault occurs in a capacitor group, the votlage across the corresponding measuring capacitors 28, 38 will alter so that the relay 4 receives voltage and closes the contact 41 which is inserted in some type of indicating or releasing circuit.

It is clear that since the voltages compared with the relay 4 are pure direct voltages, it is possible for this relay to be completely voltageless when the battery is faultless. Possibly an amplifier may be inserted between the relay 4 and the capacitors 28 and 38 if the available difference between their charging voltages is too small to release the relay directly.

We claim:
1. Relay protection means for a single phase capacitor bank comprising two parallel branches; said relay protection means comprising a measuring transformer for each of said branches; the primary side of each transformer connected to the one of the branches; the secondary side of each transformer provided with adjusting means; a common relay means for said two branches; the output sides of said two secondary sides being connected to said common relay means in counter-connection to each other; said adjusting means of said two secondary sides being adjusted so that the difference between the output signals from said secondary sides is as little as possible in relation to each of said signals, each of said secondary sides comprising a band-pass filter inserted between the secondary winding of the proper transformer and said adjusting means, the said band-pass filter being tuned for the fundamental frequency of an alternating voltage connected to said capacitor bank.

2. Relay protection means for a single phase capacitor bank comprising two parallel branches; said relay protection means comprising a measuring transformer for each of said branches; the primary side of each transformer connected to the one of the branches; the secondary side of each transformer provided with adjusting means; a common relay means for said two branches; the output sides of said two secondary sides being connected to said common relay means in counter-connection to each other; the output side of each secondary side provided with rectifying means; said adjusting means of said secondary sides adjusted so that the rectifier output signals from said two secondary sides are equal, said adjusting means comprising a potentiometer; an end terminal and an adjustable tapping of said potentiometer forming the output from said potentiometer, said rectifying means of each branch comprising a first and a second capacitor, each in series with a diode; said two capacitors together with their diodes being connected in parallel to the output from said potentiometer in such a way that said two diodes are reverse-parallel connected; a resistor connected in parallel to the second of said capacitors; said two resistors of the two branches being connected in series to said relay means in such a way that the voltages over said two resistors are directed opposite to each other.

References Cited

UNITED STATES PATENTS 3,143,687   8/1964   Hjertberg et al. _____ 317—12
3,275,889   9/1966   Sharp et al. _____ 317—27
3,319,120   5/1967   Fahlen _____ 317—12

JOHN F. COUCH, Primary Examiner

W. H. BEHA, JR., Assistant Examiner

U.S. Cl. X.R.

317—26, 53